Dec. 5, 1961   J. E. WOLFE   3,011,210
AIRCRAFT ENCLOSURE EDGE ATTACHMENT.
Filed Jan. 20, 1958
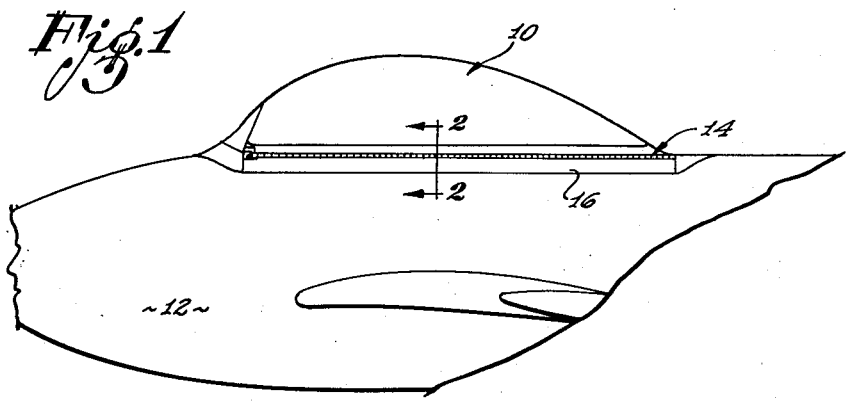
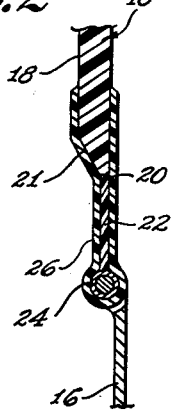
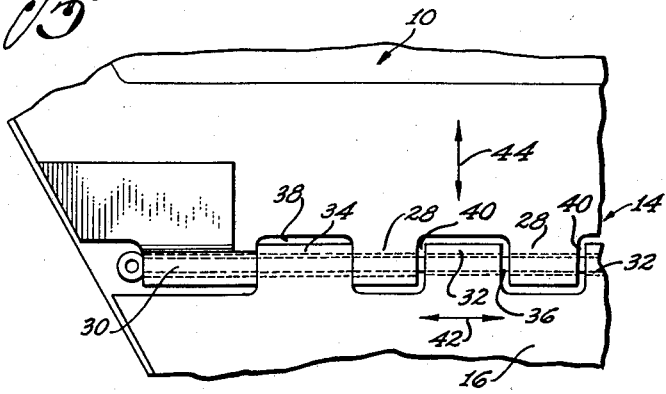
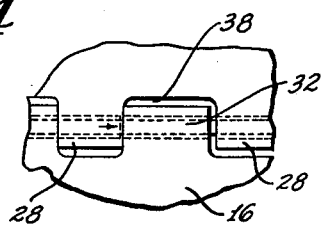
INVENTOR:
John E. Wolfe
By Willard M. Graham
AGENT United States Patent Office 3,011,210
Patented Dec. 5, 1961

3,011,210
AIRCRAFT ENCLOSURE EDGE ATTACHMENT
John E. Wolfe, Torrance, Calif., assignor to Northrop Corporation, a corporation of California
Filed Jan. 20, 1958, Ser. No. 709,970
3 Claims. (Cl. 16—128)

This invention has to do with aircraft and more particularly with the edge structure of the canopy or cockpit enclosure.

It is a well known fact and an existing problem that as the speed of present day aircraft increases the exterior skin temperature increases. In some cases the skin temperature becomes extremely hot and deforming of the metal skin as well as the plastic cockpit enclosure occurs. Further, when the plastic is subjected to heat it will expand in all directions and the amount of heat, of course, determines the percentage of expansion. The contrary is true as well; the absence of heat causes contraction in all directions. The expansion and contraction of the cockpit enclosure has and does cause a considerable amount of difficulty. Heretofore, bolts, studs, rivets and other types of fasteners have been used to connect the edge of the cockpit enclosure to the aircraft structure or more particularly to the side beam that is about the peripheral edges of the cockpit.

These enumerated fasteners have greatly restricted expansion of the plastic enclosure. The expansion forces impose themselves on the fasteners which react as compression forces. When the expansion forces, created by the heat, are great enough cracking, checking, or permanent deforming of the enclosure occurs which could seriously impair the operation of the aircraft. For instance, if one of the foregoing results occurred, a weakness in structure is apparent. This weakness then is acted upon by the tremendous flow of air which could cause additional weaknesses. A cracking of the canopy could result in a loss of air compression in the cockpit which could result in reducing the flying capabilities of the pilot.

Therefore, it is an object of this invention to provide an aircraft enclosure edge attachment that will expand and contract without there occurring any cracking, checking, warping or deforming and at the same time will minimize secondary stresses.

Another object of this invention is to provide an aircraft enclosure edge attachment that has a unique plastic laminate construction that readily mates with the canopy side beam structure.

Briefly the invention comprises a canopy and canopy side beam structure having a piano hinge arrangement therebetween that provides structure that will permit contraction and expansion.

FIGURE 1 is a side elevation view illustrating the canopy or cockpit enclosure and its relationship to the canopy side beam structure of an aircraft.

FIGURE 2 is an enlarged, cross-sectional view taken on line 2—2 of FIGURE 1 looking in the direction indicated, illustrating and having embodied therein the present invention.

FIGURE 3 is a side elevation view of FIGURE 2 illustrating the node structure of both the enclosure edge attachment and canopy side beam structure.

FIGURE 4 is a view illustrating a canopy node in relationship to the canopy side beam node and the expansion of the first mentioned node with respect to the second.

Referring to the drawings for a more detailed description of the present invention 10 designates a clear plastic canopy of an aircraft 12. The canopy has an edge attachment broadly designated 14 that mates with the canopy side beam 16, FIGURE 1.

Attention is directed to FIGURES 2 and 3 where a more detailed illustration of the edge attachments may be seen. The canopy 10, as stated, is of clear plastic. The side 18 of the canopy immediately adjacent the blunt edge 20 is chamfered or beveled as at 21. Projecting from and in linear alignment with that side of the canopy opposed to the beveled side is a panel of unidirectional glass cloth 22. At the free end or edge of the panel is a metal bushing 24. Folded about the bushing 24, panel 22 and both sides of the canopy edge and in intimate and bonded contact with all mentioned components is a panel of Orlon 26.

In side elevation, FIGURE 3, the edge attachment just described appears as illustrated. The canopy edge attachment is made up of a series of equally spaced nodes, or projections 28, the length and width of which constitutes their extent in directions parallel and normal to the axes of bushings 24, respectively. The nodes 28 have identical lengths, widths and thicknesses, respectively, with the exception that the first node 30 has a length dimension that is not equal to the rest.

The edge of the canopy side beam 16 also is formed in a series of nodes 32 having equal overall dimensions, with the exception of the first one 34. The first node 34 has a length that equals the length of the notch between node 30 and the next succeeding node 28. However, when the side beam 16 and canopy 10 are assembled and held together by pin or rod 36, as illustrated in FIGURE 3, all the nodes are held spaced from the bottom of the corresponding notch. The result of such construction is to provide an expansion zone 38 for the edge expansion of the canopy. Additionally, the nodes 32 have a length that is less than the length of the notches between nodes 28. This construction also provides expansion zones 40 for nodes 28. The edge attachment arrangement of the side beam 16 and canopy 10 may well be described as a piano hinge attachment.

It is to be understood that the edge attachment 14 has a certain flexibility in a direction transverse to the longitudinal axis thereof. There is also a certain amount of rigidity in a direction transverse to the longitudinal axis that corresponds to and is identified by arrow 44.

The operation of the invention is as follows: Assume that an aircraft is to operate in or create a temperature environment between —65° F. and 200° F. As a result of this temperature differential the materials of the canopy will expand and contract to a greater degree than certain other parts of the aircraft. A well known law of physics states that for an isotropic body, that is, one having the same physical properties in all directions, an expansion of a given percentage in one direction is accompanied by an expansion of an equal percentage in all directions. (Obviously the same is true for contraction.) However, expansion in one or more directions may be neutralized by the application of a suitable compressive force.

The compressive force in this case constitutes node 34 which is located between node 30 and the next succeeding node 28. This node is not a true compressive force but it does prevent expansion of the nodes 28 toward node 30. On the other hand, there is no node equivalent to node 28 that prevents expansion of the nodes 28 in a direction opposite to node 30. Therefore, attention is directed to FIGURE 4. When the canopy 10 and the edge attachment 14 is caused to expand they expand in a direction opposed to node 30. There is, of course, expansion and contraction of the edge attachment in the directions indicated by arrows 42 and 44. Contraction of the nodes 28 is, of course, in a direction opposed to that of expansion.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed:

1. In an aircraft having a cockpit and a plastic canopy, means for attaching the canopy to the aircraft comprising: sheet-like attaching structure adapted to be bonded to the marginal edge of the canopy; an edge of said attaching structure defining a plurality of spaced attaching nodes and notches and being further characterized in that each of said attaching nodes has a passageway extending therethrough; side beam structure adapted to be secured to structural portions of the aircraft surrounding the cockpit; said side beam structure defining a plurality of side beam nodes and notches and being further characterized in that each of the latter nodes has an opening extending therethrough; at least one of said side beam nodes having a predetermined length substantially equal to the length of a notch defined by a pair of adjacent attaching nodes and the remainder of said side beam nodes being of less length than the predetermined length of said one side beam node; and a rod extending through the openings and passageways in all the nodes defined by said attaching and side beam structures securing said structures together with the attaching and side beam nodes in meshing relation whereby differential expansion occurring between said attaching and side beam structure is directed away from said one of said side beam nodes.

2. In an aircraft including a cockpit and a plastic canopy, means for attaching the canopy to the aircraft comprising: sheet-like attaching structure adapted to be bonded to the marginal edge of the canopy; an edge of said attaching structure defining a plurality of spaced attaching nodes and notches, the nodes including outer and side edges and having openings extending therethrough and the notches including inner edges; side beam structure adapted to be secured to structural portions of the aircraft surrounding the cockpit; said side beam structure defining a plurality of spaced side beam nodes and notches; said side beam structure nodes including outer and side edges, said side beam notches including inner edges and said side beam nodes having openings extending therethrough; at least one of said side beam nodes having a predetermined length substantially equal to the length of an attaching notch defined by a pair of adjacent attaching nodes and the remainder of said side beam nodes being of less length than the predetermined length of said one side beam node; and a rod extending through the openings in all the nodes of said attaching and side beam structure securing said structures together with the attaching and side beam nodes in meshing relation and being further characterized in that the side edges of said one side beam node contacting side edges of adjacent attaching nodes and the remaining side edges of said side beam nodes being spaced from respective side edges of attaching structure nodes whereby differential expansion occurring between said attaching and side beam structure is directed away from said one of said side beam nodes.

3. Means for attaching a plastic plate or the like to a metal plate comprising: attaching structure bonded to a marginal edge of said plastic plate; said attaching structure defining a plurality of spaced nodes and notches and each of said nodes having an opening therethrough; an edge portion of said metal plate defining a plurality of spaced nodes and notches and each of the latter nodes having an opening therethrough; at least one of said metal plate nodes having a predetermined length substantially equal to the length of a notch defined by a pair of adjacent attaching nodes and the remainder of said metal plate nodes being of less length than the predetermined length of said one metal plate node; and a rod extending through the openings in all of the nodes on said attaching structure and metal plate securing said attaching structure and metal plate together with the attaching and metal plate nodes in meshing relation whereby differential expansion occurring therebetween is directed away from said one of said metal plate nodes.

References Cited in the file of this patent

UNITED STATES PATENTS

| | | |
|---|---|---|
| 644,078 | Horn | Feb. 27, 1900 |
| 1,625,612 | Jensen | Apr. 19, 1927 |
| 2,696,451 | Snyder | Dec. 7, 1954 |
| 2,734,234 | Eckel | Feb. 14, 1956 |
| 2,762,076 | Kiba | Sept. 11, 1956 |
| 2,784,926 | Bonza et al. | Mar. 12, 1957 |